(12) United States Patent
Knauerhase et al.

(10) Patent No.: US 6,237,031 B1
(45) Date of Patent: May 22, 2001

(54) SYSTEM FOR DYNAMICALLY CONTROLLING A NETWORK PROXY

(75) Inventors: Robert Conrad Knauerhase, Portland; Michael Man-Hak Tso, Hillsboro, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/000,711

(22) Filed: Dec. 30, 1997

Related U.S. Application Data

(60) Provisional application No. 60/042,071, filed on Mar. 25, 1997.

(51) Int. Cl.[7] ............................ G06F 15/177; G06F 15/16
(52) U.S. Cl. ...................... 709/221; 709/220; 709/203
(58) Field of Search ............................... 709/203, 217, 709/218, 219, 220, 221, 228; 711/166; 712/15; 713/100, 200, 201; 345/333, 335

(56) References Cited

U.S. PATENT DOCUMENTS

| | | | |
|---|---|---|---|
| 5,373,375 | 12/1994 | Weldy | 358/523 |
| 5,488,714 | * 1/1996 | Skidmore | 717/7 |
| 5,517,612 | 5/1996 | Dwin et al. | 395/166 |
| 5,559,800 | * 9/1996 | Mousseau et al. | 370/401 |
| 5,673,322 | 9/1997 | Pepe et al. | 380/49 |
| 5,684,969 | 11/1997 | Ishida | 395/342 |
| 5,701,451 | 12/1997 | Rogers et al. | 395/600 |
| 5,727,159 | * 3/1998 | Kikinis | 709/246 |
| 5,742,905 | 4/1998 | Pepe et al. | 455/461 |
| 5,752,246 | * 5/1998 | Rogers | 707/10 |
| 5,778,367 | * 7/1998 | Wesinger, Jr. et al. | 707/10 |
| 5,805,735 | 9/1998 | Chen et al. | 382/239 |
| 5,884,312 | * 3/1999 | Dustan et al. | 707/10 |
| 5,905,979 | * 5/1999 | Barows | 707/1 |
| 5,961,594 | * 10/1999 | Bouvier et al. | 709/223 |
| 6,049,821 | * 4/2000 | Theriault et al. | 709/203 |

OTHER PUBLICATIONS

Dave et al., "Proxies, Application Interface, and Distributed Systems", 1992 IEEE, pp. 212–220.*

Hokimoto et al., "An Approach for Constructing Mobile Applications Using Service Proxies", 1996 IEEE Proceedings of the 16 ICDCS, pp. 726–733.*

Armando Fox and Eric A. Brewer, "Reducing WWW Latency and Bandwidth Requirements by Real–Time Distillation," Fifth International World Wide Web Conference, May 6–10, 1996.

Armando Fox et al., Adapting to Network and Client Variability via On–Demand Dynamic Distillation, University of Cal. at Berkeley, Sep. 1996.

* cited by examiner

Primary Examiner—Zarni Maung
Assistant Examiner—Jason D. Cardone
(74) Attorney, Agent, or Firm—Kenyon & Kenyon

(57) ABSTRACT

A system for dynamically controlling a network device is implemented in a network device including a parser and a service provider. The parser includes instructions for selectively invoking the service provider in response to a command parsed from an external input received by the network device.

11 Claims, 3 Drawing Sheets

SYSTEM FOR DYNAMICALLY CONTROLLING A NETWORK PROXY

This application claims the benefit of U.S. Provisional Application Ser. No. 60/042,071 titled "System for Dynamically Controlling a Network Proxy," filed Mar. 25, 1997 by Robert C. Knauerhase et al. and assigned to Intel Corporation, the disclosure of which is expressly incorporated herein by reference.

BACKGROUND OF THE INVENTION

1. Field of the Invention

The present invention relates generally to the field of computer networking, and in particular to a method and apparatus for enabling a device configured as a network proxy to perform a predetermined action in response to dynamic input.

2. Related Art

It is known to deploy a network proxy, or proxy server, as an intermediary between one or more client computers and an external network such as the Internet. Network proxies are described generally in Ian S. Graham, *HTML Source Book: A Complete Guide to HTML 3.0* 403 (2d ed. 1996). Most existing network proxies, however, lack any ability for command processing or dynamic configuration. Instead, network proxies are typically preconfigured using static control panels and settings stored in, for example, ".INI" files or MS-Windows registry entries. These settings remain unchanged for as long as the network proxy is running. Moreover, such network proxies lack any facility for dynamically receiving and acting upon commands or instructions that would effect a reconfiguration of the network proxy. This is because network proxies have typically been used only as a pipeline. For example, a network proxy used for World-Wide Web (WWW) access simply passes HTTP requests received from a client computer to a server computer capable of servicing that request. Likewise, content which the network proxy receives from the server computer in response to such a request is simply passed to the requesting client computer. In other words, the network proxy does not inspect content passing through it.

In view of the foregoing limitations of existing technology, there is a need for a network proxy capable of acting upon information passed to it, whether it be a command embedded in a request originated by a client computer or content provided by a server computer. Although such dynamic control of network proxies is desirable, it is impractical to expect the expansive Internet infrastructure to quickly change to accommodate such a new capability. For this reason, it is desirable to implement this new capability in a way that does not require changes to existing client computers or server computers.

SUMMARY OF THE INVENTION

The present invention relates to systems, methods and devices for dynamically controlling a network proxy. Embodiments may be used, for example, to dynamically effect network reconfigurations, to alter operational parameters of the network proxy, and to transcode network content prior to transmitting it to a client device.

According to one particular embodiment, a dynamically-controllable network device comprises a parser and a service provider. The parser includes instructions for selectively invoking the service provider in response to a command parsed from an external input received by the network device.

DETAILED DESCRIPTION

Figure 1:
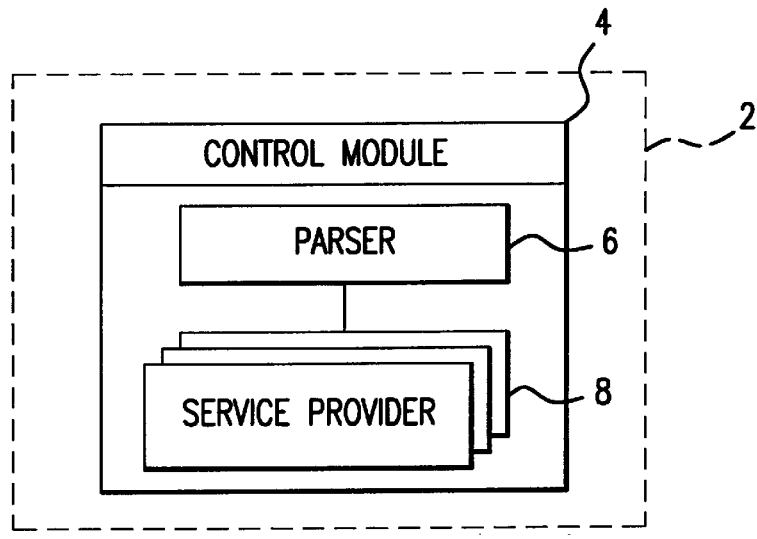
FIG. 1 is a schematic diagram illustrating a dynamically controllable network device according to an embodiment of the present invention.

According to a first embodiment of the present invention, illustrated schematically in FIG. 1, a means is provided by which a network device 2 (which may be any computer configured to act on behalf of another computer for network transactions) may be instructed to act in a particular manner based upon an externally-originating input. Such input may originate from, for example, a system administrator. Network device 2 is configured to inspect network traffic passing through it. In some instances, network device 2 may intercept commands and take certain predetermined responsive actions. In other instances, network device 2 may take certain actions based upon a characteristic of the content it receives, such as a datatype or MIME (Multipurpose Internet Mail Extensions) type. Such actions may include, for example, setting operational parameters on network device 2, such as the size of a cache storage; remote management of network device 2, such as retrieving/purging log files, obtaining system status information, and restarting network device 2; and promulgating software upgrades.

In this embodiment, network device 2 includes a control module 4 having a parser 6 and a plurality of service providers 8. Control module 4 may be implemented, for example, as a software module installed in network device 2. Parser 6 is configured to act upon an external input received by control module 4, such as a request for a network object generated by a client device or a reply to such a request provided by a network server device. In this particular embodiment, parser 6 is responsible for selectively invoking one or more of service providers 8 based upon a predetermined selection criterion. The predetermined selection criterion may be, for example, a command embedded within a request, a characteristic of a received request or data object, a condition of network device 2 itself, combinations of the foregoing, and so on.

Figure 2:
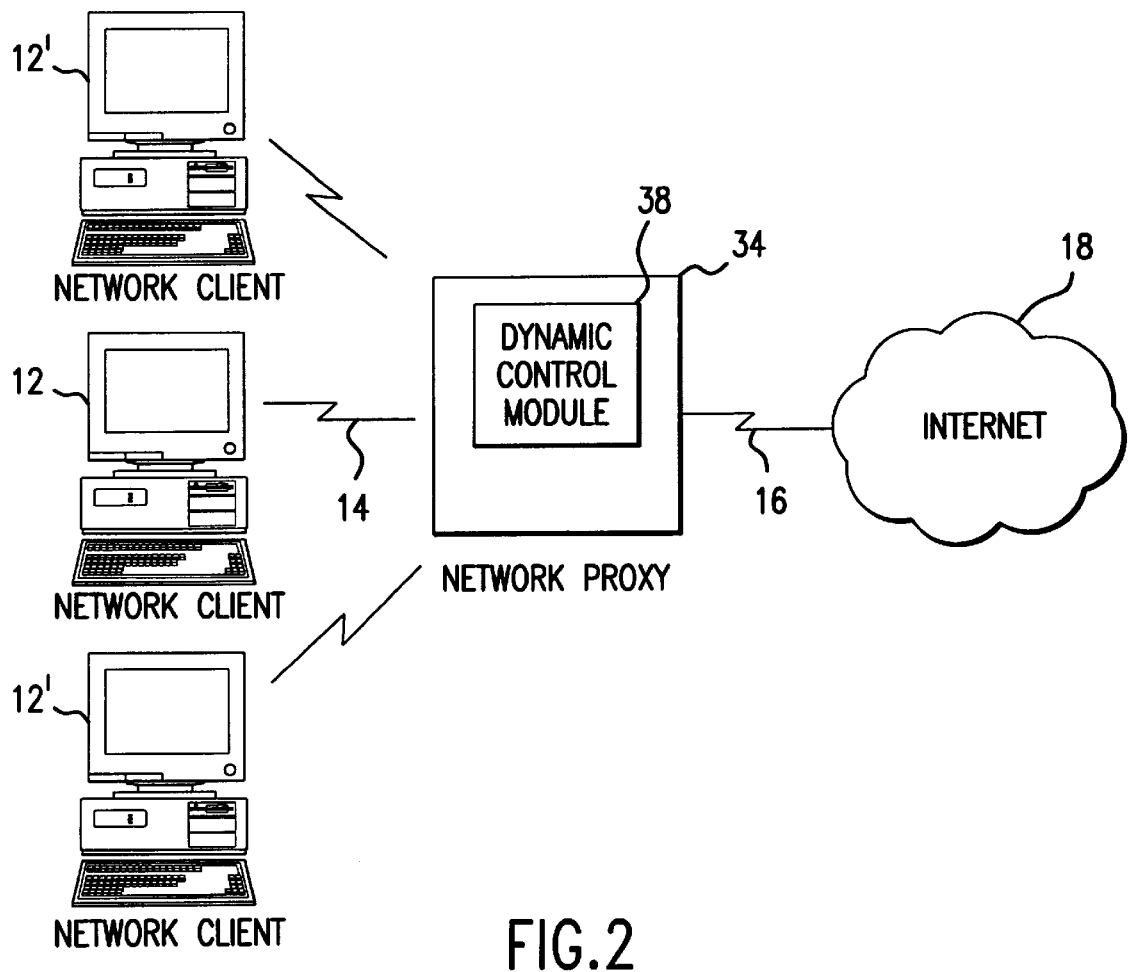
FIG. 2 is a schematic diagram illustrating an embodiment of the present invention in which a dynamically controllable network device is implemented as a network proxy.

According to another embodiment of the present invention, illustrated schematically in FIG. 2, a dynamically-controllable network device may be implemented as a network proxy. A network proxy, or proxy server, is typically used in conjunction with so-called "firewall" software to protect a LAN (Local Area Network) from unauthorized access over the Internet. A firewall, typically installed on a gateway computer that links a LAN to the external world, restricts externally-originated network packets from entering the local network, thereby protecting the LAN from hazards such as unauthorized access. The firewall, however, also prevents network users from directly accessing external resources such as the Web. Network proxies are often used to address this shortcoming. See Graham, at 403.

Network proxies are usually configured to have free access to both internal LAN resources and external resources, and can safely pass data back and forth across the firewall. Users may then be given safe, though indirect, access to Web resources by configuring the user's Web browser to reference the network proxy instead of external target servers. When the Web browser is used to retrieve information from outside the firewall it sends a request to the network proxy, which then completes the request and returns the result to the requester. Id.

Referring now to FIG. 2, according to this embodiment a dynamically-controllable network proxy 34 manages the transfer of data from the Internet 18 to a network client 12. Network client 12 and network proxy 34 may be any computers having suitable data communications and processing capabilities and capacities. Network client 12 communicates requests for information to, and receives information from, network proxy 34 over a client/server communications link 14. Client/server communications link 14 may comprise, for example, a so-called "slow network" using, for example, POTS (Plain Old Telephone Service) dial-up technology or wireless connections. Alternatively, client/server communications link 14 may comprise a socalled "fast network," such as a LAN or WAN (Wide Area Network), which is capable of operating at much higher speeds (for example, 5× to 10×) than are possible with slow networks. Combinations of these access methods are also possible. For example, network client 12 may use a POTS or wireless dial-up connection to a modem bank maintained by an ISP (Internet Service Provider), which is in turn connected to network proxy 34 over a LAN. Network proxy 34 communicates with computers resident on Internet 18 through server/network communications link 16, which may comprise any suitable communications medium known in the art. Server/network communications link 16 is typically a much faster connection than client/server communications link 14.

Network proxy 34 may be implemented, for example, as part of a network server, as a stand-alone computer in communication with a network server, or even as a distributed system of computers. Network proxy 34 may be coupled, for example, to a network server (not shown), an ISP's network, a corporate network, or anywhere on Internet 18, and provides multiple users with a means to obtain content resident on Internet 18. Network proxy 34 may also be coupled to one or more additional network proxies (not shown). Network proxy 34 differs significantly from known network proxies, which generally are little more than a conduit for requests to, and replies from, external Internet resources. Here, network proxy 34 not only examines such requests and replies, but may act on commands in the requests by, for example, dynamically reconfiguring one or more of its operational parameters.

Figure 3:
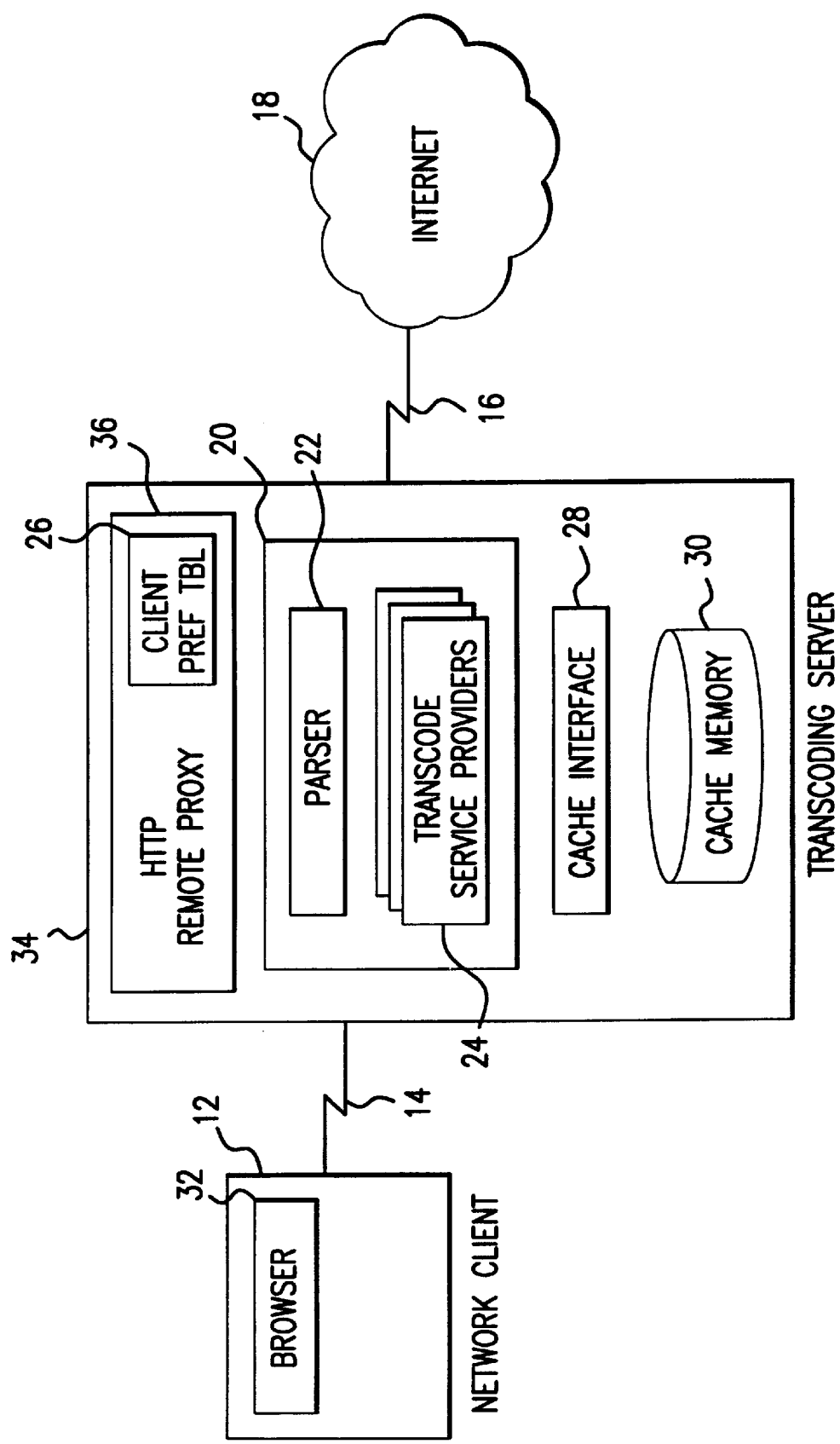
FIG. 3 is a schematic diagram illustrating an embodiment of the present invention in which a dynamically controllable network device is implemented as a transcoding server.

Referring now to FIG. 3, according to yet another embodiment of the present invention, the dynamically-controllable network device may be implemented as a transcoding server 34 including a transcoder 20 includes a parser 22 and a plurality of transcode service providers 24. Parser 22 is configured to act upon data received by transcoder 20, such as a request for a network object generated by a client device or a reply to such a request provided by a content server device. In this particular embodiment, parser 22 is responsible for selectively invoking one or more of transcode service providers 24 based upon a predetermined selection criterion. As illustrated, transcoding server 34 may include an HTTP (HyperText Transfer Protocol) remote proxy 36 capable of accessing Internet 18 over server/network communications link 16. Using transcoder 20, HTTP remote proxy 36 is capable of transcoding (for example, adding, changing and/or deleting) content received from Internet 18 prior to returning it to a requesting network client 12.

Looking more closely at the embodiment in FIG. 3, parser 22 manages the transcoding of data to be transmitted from transcoding server 34 to network client 12. To this end, parser 22 controls transcode service providers 24 to selectively transcode content based on a predetermined selection criterion. For example, one or more transcode service providers 24 may provide the capability to compress and/or scale different types of data content, such as image, video, or HTML (HyperText Markup Language). As is explained further below, one or more transcode service providers 24 may also be provided to act upon a command or other information contained in a request or a data object received by transcoding server 34, or any other information determinable by transcoding server 34, to effect the dynamic control functionality described herein.

As shown in FIG. 3, transcoding server 34 may also include a server-side cache memory 30 managed by a server-side cache interface 28. Server-side cache memory 30 may be used to store both original and transcoded versions of content for later transmission to network client 12 without the need to re-retrieve the content from Internet 18 or to re-transcode the content.

Transcoding server 34 is coupled to network client 12 by client/server communications link 14. Network client 12 includes a browser 32, such as the Netscape Navigator v.3.0 browser (although the invention is not limited in this respect), which manages the presentation of data to a user. In this embodiment, network client 12 is "non-enabled," meaning no specialized transcoding software is preloaded on network client 12.

Parser 22 may comprise a relatively simple, uniform interface to HTTP remote proxy 36, and may provide an API (Application Programming Interface) for dynamically controlling transcoding server 34 and/or for transcoding data received by HTTP remote proxy 36. Parser 22 manages one or more transcode service providers 24 that are accessed through a common SPI (Service Provider Interface). In this particular embodiment, parser 22 is designed in compliance with the Windows Open Systems Architecture (WOSA), and may be implemented as a Win32 DLL (Dynamic Link Library). The WOSA architecture, described in *Readings on Microsoft Windows and WOSA* (Microsoft Corp. 1995), enables additional transcode service providers 24 to be dynamically added to the system to provide new features, such as new or improved transcoding algorithms, while at the same time not requiring changing or retesting other software components in the system. This feature is especially beneficial where transcoding server 34 also interacts with "enabled" network clients equipped with specialized transcoding software. Transcoding server 34 may advantageously be configured flexibly enough to readily interact with both non-enabled and enabled network clients.

Like parser 22, server-side cache interface 28 may be modeled after a standard Get/Set interface. Server-side cache memory 30 essentially "owns" all cached objects, in that it manages the properties and storage of the objects and may invalidate any nonlocked object at any time; however, the actual format of any given cached object is known only by parser 22 and its associated transcode service providers 24. Thus, for data integrity and transcoding efficiency purposes, all access to server-side cache memory 30 in this embodiment is through parser 22.

In this particular embodiment, parser 22 includes the following calls:

GetObject(URL, InParams, &OutParams, &OutStream, . . . );

GetScaledObject(URL, InParams, &OutParams, &OutStream, Stage, . . . );

PutObject(URL, InParamStruct, &InStream, &OutParams, &OutStream, . . . ).

Parser 22 uses these calls to manage the provision of requested content to network client 12.

The GetObject( ) call is used to service non-enabled client requests, and returns a non-transcoded (i.e., original) version of a specified hypertext object. In this embodiment, transcoding server 34 assumes that each HTTP request has a unique thread that may be blocked until the request is satisfied. Accordingly, the GetObject( ) call will block until it either returns the requested data stream or indicates failure with a cause (e.g., object does not exist). This ability to return a so-called standard hypertext object is advantageous for compatibility reasons, enabling embodiments of the present invention to be used with existing browsers that do not include support for certain transcoding functionality (e.g., advanced data compression), and enabling users to selectively retrieve non-transcoded versions.

The GetScaledObject( ) call is similar to GetObject( ), and is also used to request an object from server-side cache memory 30; however, it adds support for requesting a particular version of that object, such as a high-quality rendition. Unlike traditional caching proxies, transcode service providers 24 can use server-side cache memory 30 to store several different versions of an object to support clients with different communications and/or presentation capabilities. Thus, an additional "Stage" parameter may be used to indicate which version of the cached object is to be returned to network client 12. Where transcode service provider 24 is configured to scale network content, it may use this parameter to request a version of a cached object having, for example, a default scaled quality, a refinement to a better-quality version, or the original non-scaled version.

In this embodiment, when network client 12 requests a hypertext object, HTTP remote proxy 36 uses either the GetObject( ) or GetScaledObject( ) call (depending on if network client 12 is capable of receiving scaled/transcoded datatypes) to retrieve the hypertext object from parser 22. If the hypertext object is not found, parser 22 uses the CreateEntryo call to create an entry (in effect, a placeholder) in server-side cache memory 30 for the new object. The new entry is returned to HTTP remote proxy 36, which requests the hypertext object from Internet 18. As a data stream for the hypertext object is returned, HTTP remote proxy 36 calls parser 22 using the PutObjecto call, passing into this call the new entry and the handle to the data stream to be placed into the entry. Parser 22 selects an appropriate transcode service provider 24 based, for example, on the content type of the data stream. In this context, the term content type encompasses a datatype, an HTTP MIME (Multipurpose Internet Mail Extensions) type, a content format, and so on. The selected transcode service provider 24 uses a separate thread to read the incoming data stream, transcode it, and place it within the entry of server-side cache memory 30. The current thread immediately returns to HTTP remote proxy 36, which once again calls GetScaledObject( ) (or GetObject( )). This case will always result in a cache hit. This thread then works simultaneously with the separate thread in the PutObject( ) to tunnel data (either original or transcoded) from transcoding server 34 to network client 12.

Multiple-thread processing may be used to improve the efficiency of transcoding server 34 by not waiting for a hypertext object to be received in its entirety by HTTP remote proxy 36, or added in its entirety to server-side cache memory 30, before beginning to send the object to network client 12. Another benefit of multiple-thread processing is that parser 22 may efficiently process requests for the same hypertext object from multiple network clients 12. The hypertext object need only be retrieved from Internet 18 once, and appropriate versions may be transmitted to such multiple network clients 12 concurrently. It should be noted, however, that embodiments of the present invention may be implemented without multiple-thread processing.

In accordance with the embodiment illustrated in FIG. 3, transcoding server 34 may be dynamically controlled to effect any of a wide variety of operations, such as reconfiguring operational parameters of transcoding server 34. For example, in order to reconfigure which network devices are permitted to access transcoding server 34, an HTTP message may be sent to parser 22, causing parser 22 to update (either itself or through transcoding service provider 24) a security mechanism maintained by transcoding server 34 (for example, a table of valid network addresses). Similarly, an HTTP message could be sent to transcoding server 34 to effect a reconfiguration of one or more parameters used by transcoding service providers 24 to transcode content prior to transmission to network client 12, such as instructing transcoding service provider 24 to delete all occurrences of a particular word from content passed through it. Other examples of the type of dynamic control that may be exerted using embodiments of the present invention include causing transcoding server 34 to use more (or less) CPU resources for particular operations, reconfiguring cache memory 30, and clearing cache memory 30.

Figure 4:
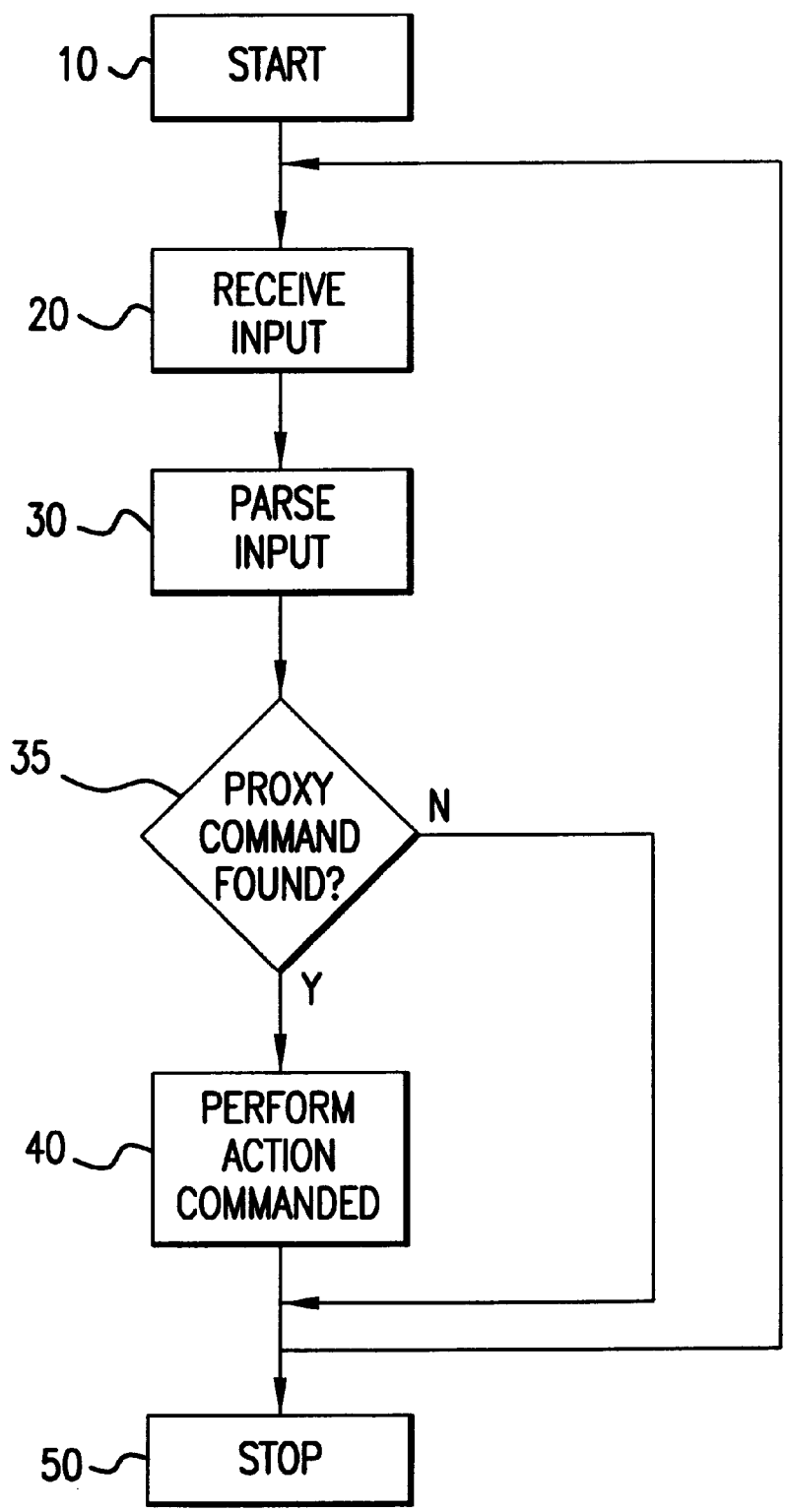
FIG. 4 is a flow diagram illustrating a method for dynamically controlling a network device according to an embodiment of the present invention.

To further describe the operation of a dynamically-controllable network device, FIG. 4 provides a flow diagram describing a general method for dynamically controlling network device according to an embodiment of the present invention. Processing begins with receipt by the dynamically-controllable network device of an input from another network device (Step 20). Where the dynamically-controllable network device comprises a network proxy, such other network device might comprise a client device or a content server. The dynamically-controllable network device then parses the received input in an effort to extract a command (Step 30). Assuming a command is found, the dynamically-controllable network device then performs some predetermined action in response to the command (Step 40). The method of this embodiment may be used, for example, to provide the dynamic control functionality described above.

A benefit of a dynamically-controllable network device according to embodiments of the present invention is that no changes need be made to existing network infrastructure. In an embodiment where the network device comprises a network proxy used for Web transactions, for example, commands may be sent to the network proxy via standard HTTP "POST" methods to special URLs. Accordingly, the only client software required to issue proxy commands is a standard Web browser, with no special configuration required of the client device other than specifying an HTTP proxy as a destination device in the manner currently known in the art. On the other hand, the network proxy can also accept commands from specialized client software if present. Similarly, the dynamically-controllable network proxy may freely interact with existing server devices. The proxy may generate its own forms and status replies for the client as needed, without the need for any specially-configured HTTP server software or CGI (Common Gateway Interface) script-processing capability. For example, the proxy can generate an HTML form that is displayed by the client's browser. The user may then fill in the form and submit it. The browser takes the filled-in form and uses the input to create a POST communicating the results from the HTML form. The proxy may then act on the POST, possibly generating its own status replies so that the user is informed whether or not the input command(s) worked. Such status replies would then be displayed by the browser. Using an arrangement of this type, existing servers and clients may interact with the dynamically-controllable network proxy the same as they would with any other network proxy. Embodiments of the present invention may therefore be transparently implemented in existing network infrastructures, with no need for special communications ports or special protocols.

Embodiments of the present invention may be distributed, for example, as a set of instructions residing on a storage medium. Such a storage medium might be a memory of a computer; a piece of firmware; a portable storage device, such as a diskette or other magnetic storage device, or a CD-ROM; or any other medium on which it is known to store executable instructions.

Although the present invention has been described with reference to embodiments for accessing data from the Internet, persons skilled in the art will recognize that it is equally applicable to other networking environments. For example, embodiments of the present invention may be used to enhance data communications between a network client computer and an "intranet." An intranet typically is a secure corporate network modeled after the Internet architecture, and generally includes mechanisms for communicating with external networks such as the Internet.

The foregoing is a detailed description of particular embodiments of the present invention. The invention embraces all alternatives, modifications and variations that fall within the letter and spirit of the claims, as well as all equivalents of the claimed subject matter. For example, persons skilled in the art will readily recognize that the functionality described herein may be implemented in virtually any network device capable of receiving HTTP messages, including content servers and client devices. Moreover, embodiments of the present invention may be applied to communications protocols other than HTTP. Persons skilled in the art will recognize from the foregoing detailed description that many other alternatives, modifications and variations are possible.

What is claimed is:

1. A dynamically-controllable network proxy comprising a parser module and a service provider module coupled to said parser module, said parser module including instructions for selectively invoking said service provider module in response to a command parsed from an external input received by said network proxy, said service provider module comprising instructions for performing a predetermined function at said network proxy.

2. The network proxy of claim 1, wherein said network proxy is arranged between a client and a server, said parser module further including instructions for selectively invoking said service provider module in response to a command parsed from a data object received from the server.

3. The network proxy of claim 2, wherein said service provider module comprises instructions for transcoding said data object prior to forwarding said data object to the client.

4. The network proxy of claim 1, wherein said service provider module comprises instructions for reconfiguring said network proxy.

5. The network proxy of claim 4, wherein said service provider module further comprises instructions for setting an operational parameter of said network proxy.

6. The network proxy of claim 1, wherein the external input comprises an HTTP-compliant message.

7. The network proxy of claim 1, wherein said network proxy is arranged between a client and a server, said parser module further including instructions for selectively invoking said service provider module in response to a command parsed from a request received from the client.

8. The network proxy of claim 1, wherein said network proxy is arranged between a client and a remote network device, said parser module further including instructions for selectively invoking said service provider module in response to a command parsed from a data object received by said network proxy from the remote network device.

9. The network proxy of claim 1, wherein said service provider module further comprises instructions for managing a log file used by said network proxy.

10. The network proxy of claim 1, wherein said service provider module further comprises instructions for obtaining status information from said network proxy.

11. The network proxy of claim 1, wherein said service provider module further comprises instructions for restarting said network proxy.

* * * * *

UNITED STATES PATENT AND TRADEMARK OFFICE
CERTIFICATE OF CORRECTION

PATENT NO. : 6,237,031 B1  
DATED : May 22, 2001  
INVENTOR(S) : Robert Conrad Knauerhase and Michael Man-Hak Tso It is certified that error appears in the above-identified patent and that said Letters Patent is hereby corrected as shown below:

Column 5,  
Lines 44-45, replace "Crea-teEntryo" with -- Crea-teEntry --;  
Line 50, replace "PutObjecto" with -- PutObject --.

Signed and Sealed this

Fifth Day of March, 2002

Attest:

JAMES E. ROGAN  
*Attesting Officer*  *Director of the United States Patent and Trademark Office*